United States Patent [19]

Arachi

[11] 4,167,430
[45] Sep. 11, 1979

[54] METHOD FOR FABRICATING A COMPOSITE BONDED STRUCTURE

[75] Inventor: John M. Arachi, Riverside, Calif.

[73] Assignee: General Dynamics Corporation, Pomona, Calif.

[21] Appl. No.: 901,367

[22] Filed: Apr. 28, 1978

[51] Int. Cl.² .................. B29D 3/00; B29D 3/02; B29G 5/00
[52] U.S. Cl. .................... 156/212; 156/245; 264/258; 264/271; 264/313; 264/319; 264/337
[58] Field of Search .............. 264/313, 258, 259, 271, 264/137, 255, 277, 285, 294, 324, 241, 250, 254, 255, 261, 263, 267, 275, 338, 225, 319; 156/212, 245, 213

[56] References Cited

U.S. PATENT DOCUMENTS

| | | | |
|---|---|---|---|
| 2,484,141 | 10/1949 | Alex | 244/123 |
| 2,593,714 | 4/1952 | Robinson | 244/123 |
| 2,596,818 | 5/1952 | Meyers | 244/123 |
| 2,693,922 | 11/1954 | Ellison et al. | 244/123 |
| 2,773,792 | 12/1956 | Nebesar | 244/123 |
| 3,028,292 | 4/1962 | Hinds | 244/123 |
| 3,058,165 | 10/1962 | Purvis | 264/313 |
| 3,165,569 | 1/1965 | Bright | 264/313 |
| 3,273,833 | 9/1966 | Windecker | 244/123 |
| 3,470,289 | 9/1969 | Katsuki et al. | 264/313 |
| 3,879,245 | 4/1975 | Fetherston et al. | 264/241 |
| 3,962,506 | 6/1976 | Dunahoo | 428/158 |

Primary Examiner—W. E. Hoag
Attorney, Agent, or Firm—Neil F. Martin; Charles J. Fassbender; Edward B. Johnson

[57] ABSTRACT

A method of fabricating a bonded composite structure, such as a missile fin, includes the step of forming uncured components for the composite structure with appropriate molds. The individual components are placed together to form an unbonded composite of the structure. The unbonded composite is inserted into a female mold of the composite. The female mold is comprised of material having predetermined high thermal expansion properties. The female mold with the unbonded composite inserted therein is enclosed in a rigid container. The container is heated to expand the mold, apply pressure to the composite, and bond the components of the composite together in a single curing cycle.

5 Claims, 14 Drawing Figures

CLOSE RIGID BOX AND CURE

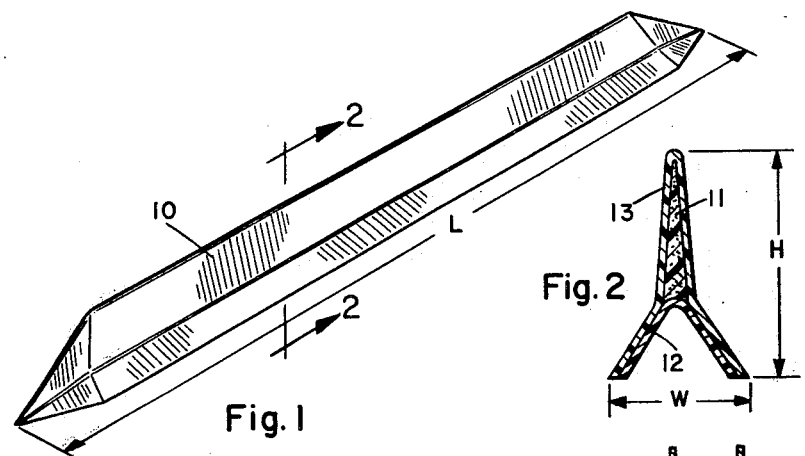
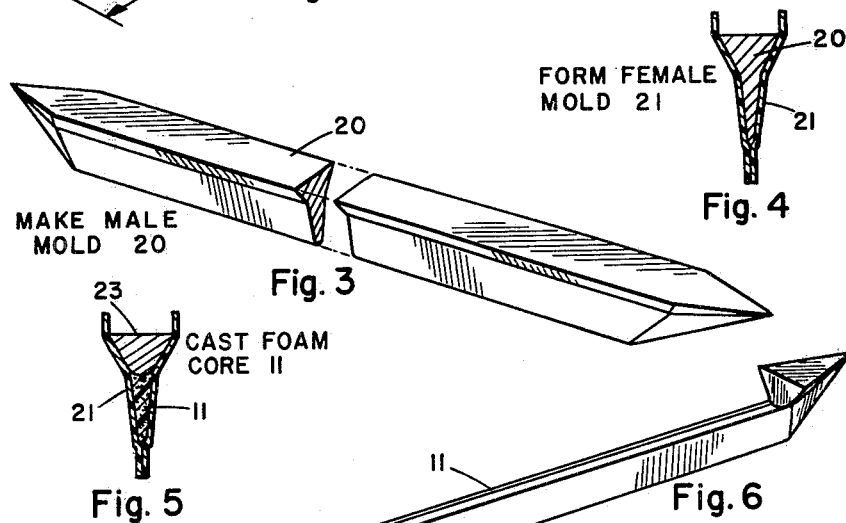
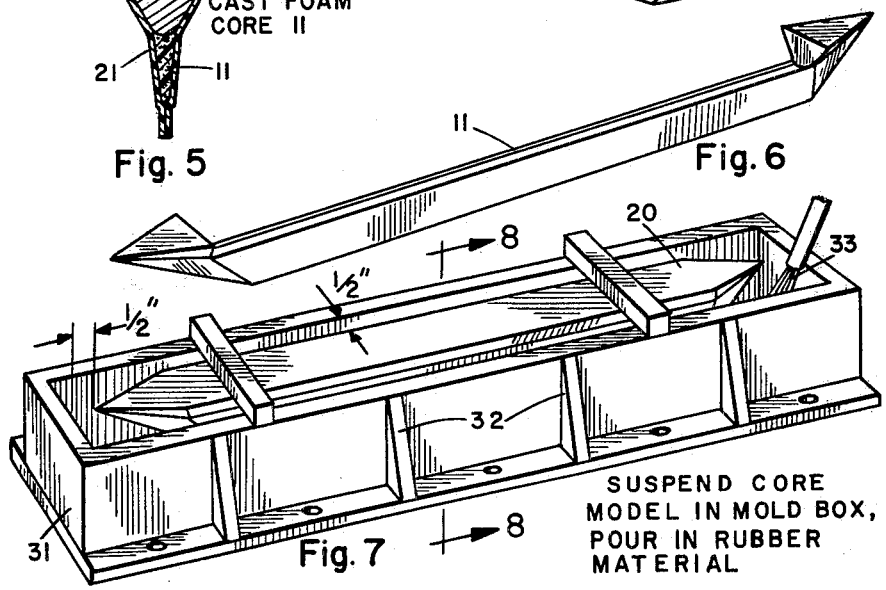

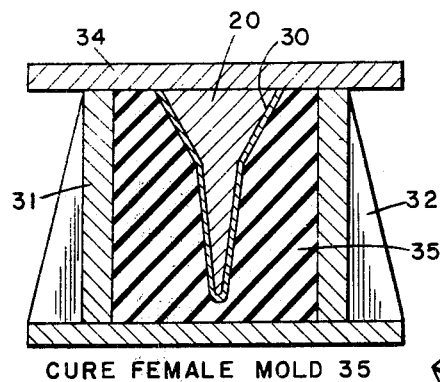
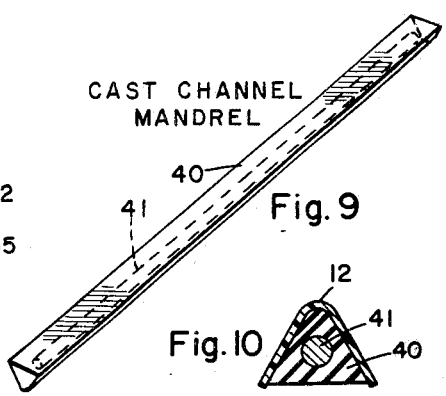
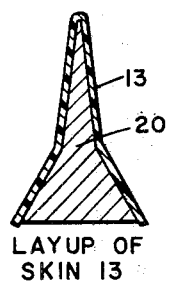
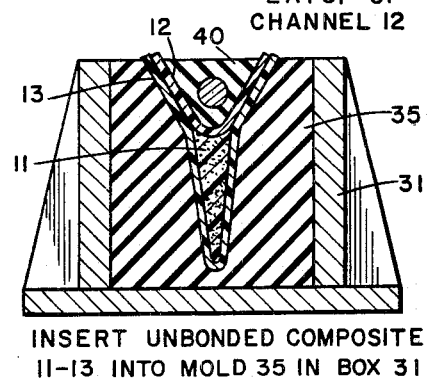
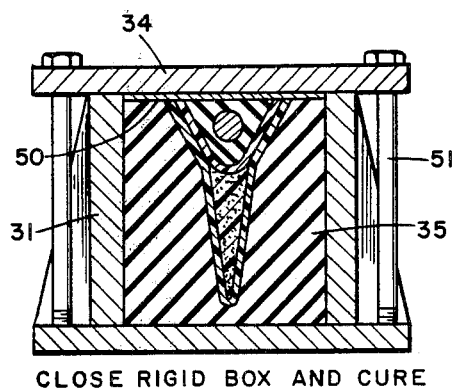
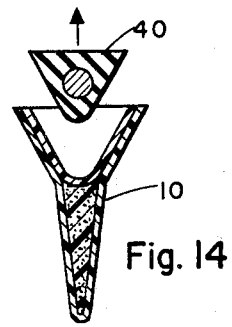

METHOD FOR FABRICATING A COMPOSITE BONDED STRUCTURE

BACKGROUND OF THE INVENTION

This invention relates to a method of fabricating a structure having a number of components which are bonded together; and more particularly to a method of fabricating composite structural wings and fins for aircraft. In aircraft such as missiles for example, it is of prime importance to be able to construct wings or fins having high strength, low weight, and high temperature resistance. This is because of the range, maneuverability, and other such performance characteristics of the missile are directly dependent upon these features.

The disclosed method is described in detail in conjunction with the fabrication of a dorsal fin for a missile. This fin is comprised of a lightweight core, a high temperature resistance skin convering which is bonded to the core, and a channel for attaching the core to the body of a missile and which is bonded to a portion of the core and the skin covering. In the prior art, fabrication of such a fin would consist of the following steps: (1) fabricating a composite cured skin shell, (2) filling the skin shell with a syntactic foam, (3) fabricating a cured channel, and (4) bonding the channel to the foam filled shell. The first and third steps involve separate layups, vacuum bag curing and post curing. These are expensive and time consuming operations. Also during the post cure, the parts have to be restricted by the tools to avoid warpage; and thus the tools are tied up during the post cure cycle. The fourth step of the prior art process calls for a separate bonding procedure, cure cycle, and a suitable adhesive. These further increase the fabrication time and cost of the fin.

It is therefore one object of the invention to provide an improved method of fabricating a composite bonded structure.

Another object of the invention is to provide a method of fabricating a composite bonded structure which requires no vacuum bagging.

Another object of the invention is to provide a method of fabricating a composite bonded structure which requires no autoclave curing.

Still another object of the invention is to provide a method of fabricating a composite bonded structure which requires only a single curing and post curing operation.

SUMMARY OF THE INVENTION

These and other objects are accomplished in accordance with the invention by a method wherein each of the uncured components are assembled together to form an unbonded composite of the structure to be fabricated. The unbonded composite is then inserted into a female mold of the composite. This female mold is comprised of material having predetermined high thermal expansion properties, such as silicone rubber. The combination of the unbonded composite and the female mold is enclosed in a rigid container. This container is heated to expand the mold, apply pressure to the composite, and bond together the components in a single curing operation.

When the disclosed method is utilized to construct a missile dorsal fin of the type described above, the core is formed by casting a resin-foam mixture in an appropriate female mold. The uncured skin covering and channel are formed by laying up a resin-fiber mixture on appropriate male molds. Subsequently, these components are assembled together to form an unbonded composite of the fin. The composite is placed into a thermally expandable female mold of the fin, which preferably is comprised of silicone rubber. The mold is heated in an enclosed rigid aluminum container in a single curing operation. During this curing, the female mold expands and bonds the component of the fin together.

BRIEF DESCRIPTION OF THE DRAWINGS

The novel features believed characteristic of the invention are set forth in the appended claims. The invention itself, however, as well as other features and advantages thereof, will best be understood by reference to the following detailed description of particular embodiments when read in conjunction with the accompanying drawings wherein:

FIG. 1 is a pictorial view of a missile dorsal fin that is to be constructed according to the invention.

FIG. 2 is a cross sectional view taken on line 2—2 of FIG. 1.

FIG. 3 is a pictorial view of a male model of the fin of FIG. 1.

FIG. 4 is a cross sectional view illustrating the formation of a female mold which is utilized to construct the core for the fin of FIG. 1.

FIG. 5 is a cross sectional view illustrating how the mold of FIG. 4 is utilized to construct the core for the fin of FIG. 1.

FIG. 6 is a pictorial view of the core constructed by the steps illustrated in FIGS. 3-5.

FIG. 7 is a pictorial view illustrating the construction of a thermally expandable female mold for the fin of FIG. 1.

FIG. 8 is a cross sectional view taken on line 8—8 of FIG. 7.

FIG. 9 is a pictorial view of a channel mandrel mold.

FIG. 10 is a cross sectional view illustrating the use of the mold of FIG. 9 to form the channel for the fin of FIG. 1.

FIG. 11 is a cross sectional view illustrating the use of the mold of FIG. 3 to form the skin for the fin of FIG. 1.

FIG. 12 is a cross sectional view illustrating the use of the ther expandable mold of FIGS. 7 and 8 to form the composite fin of FIG. 1.

FIG. 13 is a cross sectional view illustrating the mold of FIG. 12 during the cure stage.

FIG. 14 is a cross sectional view illustrating the fin of FIG. 1 after removal from the mold of FIG. 13.

DETAILED DESCRIPTION OF THE DRAWINGS

A method of fabricating a structure having a number of components which are bonded together in accordance with the invention will now be described. For illustrative purposes, the method will be described in conjunction with the fabrication of a dorsal fin for a missile—which is an example of one structure having a number of bonded components. Basically, fin 10 is comprised of a lightweight core 11, an attachment channel 12 for connecting fin 10 to the body of the missile, and a skin covering 13 for core 11 and channel 12. Preferably, core 11 is comprised of a syntactic foam such as an epoxy resin with glass microballoons. This material has a weight per unit volume which is substantially less than that of low carbon steel, aluminum alloys, or inconel/- honeycomb material, which are commonly used in the construction of dorsal fins.

Also preferably, channel 12 and skin covering 13 are comprised of a resin-fiber mixture. In one embodiment, channel 12 consists of an addition type polyimide/graphite unidirectional prepeg; and skin covering 13 consists of an addition type polyimide glass unidirectional prepeg. The term prepeg herein means a fibered cloth preinpregnated with a resin. Also in one embodiment, the fin 10 has a width W of 1.264 inches, a height H of 3.120 inches and a length L of 33.40 inches.

Several molds are required in order to construct fin 10 in accordance with the steps of the invention. These include a male mold 20 of core 11 and channel 12 constructed as illustrated in FIG. 3. Suitably, model 20 may be comprised of metal, or wood. This mold is utilized as a mold for forming skin covering 13 as will be described shortly in conjunction with FIG. 11. In addition, mold 20 is utilized to construct a female mold 21, which is utilized to form core 11. Mold 21 is illustrated in cross sectional view in FIG. 4. Preferably, mold 21 is formed by a wet layup of glasscloth and epoxy resin on mold 20. This glasscloth-epoxy resin combination is allowed to harden in air at room temperature for approximately two hours.

FIG. 5 illustrates how mold 21 is utilized to form core 11; and FIG. 6 illustrates the core 11 which is formed. To begin, the inside surface of mold 21 is coated with a layer of release material, such as an epoxy Parfilm spray or past wax. Subsequently, the syntactic foam material which comprises core 11 is poured into the narrow cavity portion of mold 21. A male mold 23 of channel 12, covered with a film of release material, is then placed in the channel portion of mold 21. Mold 23 may be comprised of a metal, and the release material may be comprised of Teflon for example. The combination of FIG. 5 is left to sit at room temperature for approximately 10 hours. Subsequently, core 11 of FIG. 6 is removed therefrom.

Mold 20 is also utilized to form a thermally expansive female mold of fin 10, which will be used in accordance with steps of the invention. To form this mold, a layer 30, approximately 100 mils thick, of inert material is formed on the exterior surface of model 20. Layer 30 adds thickness to model 20 approximately equal to or slightly greater than the thickness of skin 13. Suitably, layer 30 is comprised of a sheet of wax. This combination is suspended in a rigid container 31 as illustrated in FIG. 7. Container 31 has a length approximately one inch larger than length L, a width approximately 1 inch larger than the width W to leave ½ inch spaces at the sides and ends, and a height approximately ½ inch larger than height H. Preferably, container 31 is comprised of a metal such as aluminum, and contains gussets 32 at spaced apart intervals along its length.

The empty space which remains in container 31 after mold 20 is suspended therein is filled with a material 33 having predetermined high thermal expansion properties. Preferably, material 33 is a silicone rubber such as Dapco Cast 37 silicone rubber with an 8% accelerator. A lid 34 caps containers 31 as illustrated in FIG. 8. The resulting combination is allowed to set at room temperature for approximately two days. Subsequently, mold 20 along with its wax film 30 are removed. Thereafter, container 31 with material 33 inside are cured for two hours at approximately 150 degrees. Subsequently, mold 35 is removed from box 31 and post cured for two hours at 250° F., and for two more hours at 350° F.

Mold 35 is then ready for use in those steps of the disclosed process which bonds components 11-13 together as one composite unit.

Referring now to FIGS. 9 and 10, the steps for forming channel 12 will be described. To begin, a channel mandrel 40 having a stiffening rod 41 embedded therein is constructed. Mandrel 40 is made of the same material 33 which comprises mold 35. A metal mold may suitably be utilized to shape mandrel 40. Also suitably, rod 41 may be of ⅜ inch diameter steel.

To form channel 12, a number of plies of a resin-fiber mixture are laid on the exterior surface of mandrel 40. In one embodiment, twelve plies of unidirectional polyimide/graphite prepeg were used. Specifically, these twelve plies were laid up at angles of 0°, +45°, −45°, 90°, 0°, 0°, 90°, −45°, +45°, 90°, 0°, and 0°. In this embodiment, the prepeg had a 35-40% resin content.

The skin coating 13 is formed by laying up a resin-fiber mixture on mold 20 in a similar manner. This is illustrated in FIG. 11. Preferably, a coating of a parting agent, such as Armalon, is formed on the exterior surface of mold 20 before the layup of skin 11. Suitably, skin 11 is comprised of five plies of polimide/glass prepeg having a net resin content of 30±20%. These prepeg substances are commercially available, and go by various tradenames such as Hexcel F 178/7781.

Referring now to FIGS. 12-14, the remaining steps for forming fin 10 in accordance with the disclosed process are illustrated. These steps include placing components 11-13 together to form an unbonded composite of fin 10. This composite is illustrated in FIG. 12. The unbonded composite is subsequently inserted into female mold 35; and the resulting combination is inserted into container 31. Then, mandrel 40 is laid in the space formed by channel 12.

A layer 50 of release material, such as one ply of Armalon and two plies of 181 glasscloth is placed on top of mold 35 and mandrel 40. Cover 34 is laid in place on container 31, and is rigidly held in position via bolts 51. The resulting structure is illustrated in FIG. 13. This structure is cured for approximately one hour at 350° F. During this curing process, mold 35 expands in accordance with its predetermined high thermal expansion properties. Thus, a calculable pressure is applied equally to all surface areas of the composite while components 11-13 are bonded together. Subsequently, the bonded composite structure is removed from mold 35 and mandrel 40. This structure is then post cured for approximately four hours at 475° F.

From the foregoing, it is clear that the disclosed process enables fin 10 to be fabricated while utilizing only one cure cycle, and only one post cure cycle. Further, molds 20, 23, 35 and 40 are not tied up during the post cure process, and thus may be utilized to form additional fins. Further, no special adhesive materials are required to bond components 11-13 together. Also, no vacuum bagging and no autoclave curing is required. As a result of this time and cost saving process, the resulting bonded composite structure is built quicker and cheaper than is possible by using prior art methods.

For example, a fin of the size described would weigh about 3.4 lb. and cost about $65.00 made from low carbon steel. A similar fin of aluminum alloy would cost about $75.00/100 and weigh about 2.6 lb. An inconel/honeycomb fin would weight only 1.5 lb. but would cost about $600.00 to fabricate. In contrast, a composite fin as described herein would weigh about 1.42 lb. and cost about $80.00/100, so the advantages are obvious.

An improved method of fabricating a composite bonded structure has now been described in detail. As an exemplary use of the method, a fin for a missile was constructed in accordance therewith. It is to be understood however, that many modifications and changes can be made to the above described details without departing from the nature and spirit of the invention. For example, skin coating 13 may be comprised of various materials other than those specifically named above. For example, a particular skin coating material may be chosen to maximize the flex strength of the skin, or alternatively to minimize the weight of the fin. Therefore, since many changes and modifications can be made to the above described details without departing from the nature and spirit of the invention, it is to be understood that the invention is not limited to said details but is to be defined by the appended claims.

Having described my invention, I claim:

1. The method for forming an air foil, comprising:
   forming an outside skin for said air foil by disposing fibrous layers inpregnated with curable resin about polysilicone rubber walls defining a mold cavity of a first mold member;
   inserting a preformed foam core member within said layers;
   disposing additional fibrous layers about a male mold member and inserting said male mold member with said additional fibrous layers into said mold cavity and in contact with said foam core member;
   inserting said first mold member with assembled said fibrous layers, said additional said fibrous layers, said male mold member and said core member into a rigid container;
   heating said container and assembled said layers to a temperature sufficient to cure the resin in said layers; said first mold member expanding due to said heating and compressing the assembled said layers about said core member; and
   bonding said layers together and to said core; said male mold member forming a channel along one side of said air foil.

2. The method of claim 1 wherein said air foil is a fin or wing for an aircraft.

3. The method of claim 1 wherein said fibrous layer is made of glass fiber.

4. The method of claim 1 wherein said resin includes a polyimide.

5. The method of claim 1 wherein said foam core member is made from a thermosetting resin.

* * * * *